(12) United States Patent
Thakur et al.

(10) Patent No.: US 8,838,613 B1
(45) Date of Patent: Sep. 16, 2014

(54) IDENTIFYING TRENDS FROM MICRO-POSTS

(75) Inventors: Kumar Mayur Thakur, West Orange, NJ (US); Seyed Vahab Mirrokni Banadaki, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/398,942

(22) Filed: Feb. 17, 2012

Related U.S. Application Data

(60) Provisional application No. 61/444,690, filed on Feb. 18, 2011.

(51) Int. Cl.
*G06F 7/00* (2006.01)
*G06F 17/30* (2006.01)

(52) U.S. Cl.
CPC ................ *G06F 17/30011* (2013.01)
USPC .......................................... 707/748

(58) Field of Classification Search
CPC ................................. G06F 17/30011
USPC .......................................... 707/748
See application file for complete search history.

(56) References Cited

U.S. PATENT DOCUMENTS

| | | | |
|---|---|---|---|
| 8,375,024 B2 | 2/2013 | Goeldi | |
| 8,589,326 B2 | 11/2013 | Balasaygun et al. | |
| 2004/0193582 A1* | 9/2004 | Smyth | 707/3 |
| 2009/0327878 A1* | 12/2009 | Grandison et al. | 715/256 |
| 2011/0320715 A1 | 12/2011 | Ickman et al. | |
| 2012/0095976 A1 | 4/2012 | Hebenthal et al. | |
| 2012/0271829 A1 | 10/2012 | Jason | |
| 2012/0290551 A9 | 11/2012 | Ghosh | |

FOREIGN PATENT DOCUMENTS

| | | |
|---|---|---|
| WO | 2011163147 A2 | 12/2011 |
| WO | 2012100067 A1 | 7/2012 |
| WO | 2012116236 A2 | 8/2012 |

* cited by examiner

*Primary Examiner* — Apu Mofiz
*Assistant Examiner* — Ajith Jacob
(74) *Attorney, Agent, or Firm* — Fish & Richardson P.C.

(57) ABSTRACT

Methods, systems, and apparatus, including computer programs encoded on computer storage media, for identifying trends via representative micro-posts. One of the methods includes identifying query terms; selecting candidate documents that satisfy one or more of the terms of the query terms; selecting, from the candidate documents, candidate documents based on a weighted-coverage function for the query terms; pairing documents from the candidate documents based on a distance between the paired documents; generating one or more clusters from the paired documents, a cluster being associated with one or more topics of the query terms; selecting from the candidate documents, one or more particular documents, for one or more clusters, based on a diversity function; and providing for presentation the particular documents as representative documents that cover one or more topics associated with the one or more clusters.

31 Claims, 3 Drawing Sheets

IDENTIFYING TRENDS FROM MICRO-POSTS

CROSS-REFERENCE TO RELATED APPLICATIONS

This application claims the benefit of U.S. Provisional Patent Application Ser. No. 61/444,690, filed on Feb. 18, 2011, the entire contents of which are incorporated by reference as if set forth fully herein.

BACKGROUND

Individuals can connect and interact with other people on online social networks. Many social networks allow users to share personal information, including contact information, photographs, and videos. Another common feature of social networks is the ability of users to share posts, which may include text, hyperlinks, or any type of multimedia.

SUMMARY

This specification describes technologies for identifying and discovering hot topics and news stories that are present in online social networks. Popular queries are identified and used to retrieve a set of matching social network posts, tweets, blogs, and/or similar publications (which will be referred to as either "documents" or "micro-posts"). A subset of the retrieved documents is identified. The subset covers a large portion of currently popular topics discussed in the online environments. A cluster of documents from the subset is generated by putting each document in a cluster corresponding to other close documents in the subset. From the subset, two or more representative documents are chosen from each cluster such that a distance among the documents in the particular cluster is maximized. This provides diversified representatives for each cluster.

In general, one innovative aspect of the subject matter described in this specification can be embodied in methods that include the actions of identifying a set T of recent, popular query terms; selecting candidate documents D that each satisfy one or more of the terms of the set T; selecting, from the candidate documents D, a set S of quantity k of the candidate documents D that maximizes a weighted-coverage function $f$ for the set T of terms; pairing each document in the set S with another document in the set S based on a distance between the paired documents; generating a set C of clusters from the paired documents, each cluster in the set C being associated with one or more topics of the recent, popular query terms; selecting, from the set S, a set V of quantity p documents, for one or more clusters of the set C, that maximizes a diversity function; and presenting the set V of documents as representative documents that cover one or more topics associated with the one or more clusters.

Other embodiments of this aspect include corresponding computer systems, apparatus, and computer programs recorded on one or more computer storage devices, each configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. Each query term is a single word, one or more words, or a phrase. The diversity function is expressed as $(\Sigma_{1 \leq i \leq k,\ 1 \leq j \leq p} \Sigma_{1 \leq i' \leq k',\ 1 \leq j' \leq p} GJD(D^i_j, D^{i'}_{j'}))$. Each document in the set S is paired with another, closest document in the set S. A generalized Jaccard distance (GJD) is determined between the documents of the set S, wherein each document in the set S is paired with the other document in the set S based on the generalized Jaccard distance between the paired documents. A document $d_1$ in the set S is paired with another document $d_2$, and the document $d_2$ in the set S is paired with another document $d_3$. A document $d_1$ in the set S is paired with another document $d_2$, and the document $d_2$ in the set S is paired with the document $d_1$.

Each document in the set S is paired with another document before the set C of clusters is generated from the paired documents. Each cluster in the set C of clusters comprises at least one pair of documents from the set S, and zero or more other documents from the set S. Identifying the set T of recent, popular query terms includes determining a query score for each of multiple query terms that have been submitted to a search engine within a predetermined period of time; and selecting, as part of the set T of query terms, the query terms that have been submitted to the search engine within the predetermined period of time and that have a query score which satisfies a threshold. The query score reflects a frequency of an associated query.

The documents are micro-posts or micro-blogs. In maximizing the weighted-coverage function $f$, the set S of quantity k of the candidate documents D covers the set T of query terms to a greater extent than any other set S' of quantity k of the candidate documents D. Selecting, from the candidate documents D, a set S of quantity k of the candidate documents D that maximizes a weighted-coverage function $f$ for the set T of query terms includes: initializing an empty set of documents as the set S; and iteratively, until the set S includes the quantity k of the candidate documents D: selecting a document d, from the candidate documents D, that exhibits a maximum marginal increase in the weighted-coverage function $f$, and that is not already in the set S, and adding the document d to the set S. In maximizing the diversity function, the set V of the quantity p of documents selected for the one or more clusters has a greater sum of distances than any other set V' of quantity p documents of the set S.

Selecting, from the set S, a set V of quantity p representative documents, for a cluster $C_i$ of the set C, that maximizes a diversity function includes: initializing an arbitrary set of quantity p documents from the set S as the set V; and iteratively, until no further swap of a document from the set V results in an increase in a sum of pairwise distances of documents in the set V: determining whether swapping a document d from the set V with a document d' that is paired with the document d increases a sum of pairwise distances of documents in the set V, and swapping the document d from the set V with a document d' that is paired with the document d when determining that swapping increases the sum of pairwise distances of documents in the set V. The set V of documents is presented in association with information identifying the one or more topics associated with the one or more clusters $C_i$. Presenting the information identifying the one or more topics includes automatically obtaining a label associated with the one or more topics.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Large amounts of data are generated daily in online social networks. As a result of the real-time and fast data generation of online social networks, these systems have become a rich source for discovering news trends and hot topics over the Internet. Important topics and "hot" trends are discovered in such environments by observing topics of popular queries and/or commonly used terms in many recent micro-posts. A hotness score for each topic is quantified by analyzing popular queries and their topics. A relevance measure for each micro-post covering a topic can also be quantified. The relevance measure indicates how relevant the micro-post is to the particular topic. This information can be used to produce a clustering of important micro-posts covering hot topics in an environment.

This specification describes techniques to identify such a set of popular and diversified documents, covering a wide range of hot topics, in one or more online content generation systems, e.g., online social networks. The documents are micro-posts or micro-blogs. Further, a multi-stage real-time clustering system is described that first identifies the important news topics, partitions them into clusters each covering a different topic, and then presents each cluster with a set of head micro-posts representing each cluster.

Figure 1:
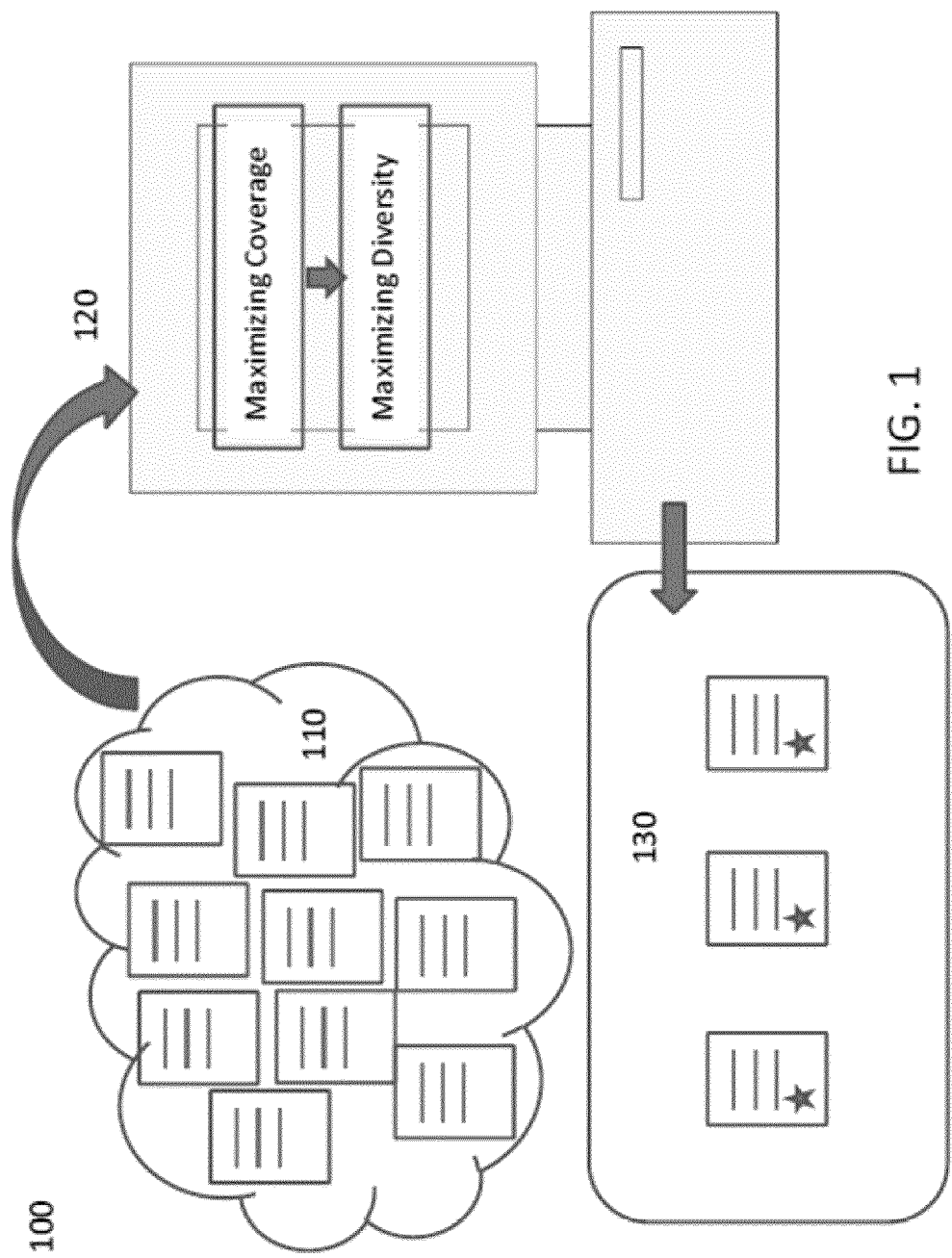
FIG. 1 is a conceptual diagram showing an example system for identifying trends using representative micro-posts.

Referring to FIG. 1, a conceptual diagram 100 illustrating an example system for identifying trends using representative micro-posts is shown. In a first state 110 of the system, hot topics are identified in an online environment by looking at a set of popular queries searched by users. Specifically, in some implementations, popular queries are identified that have been searched more often recently by users, and a set of micro-posts matching those queries are identified. An Internet search engine can identify the most relevant micro-posts for those popular queries in real time. Each query is then transformed to a set of terms, and an edge-weighted bipartite graph G(D,T,E) is constructed between the micro-posts D and those terms T. The weight of edges between a term $t \in T$ and a micro-post $d \in D$ is denoted by $w(d, t)$. This weight captures the extent to which document d covers the term t. The weight thus models the relevance of the term to the micro-post.

In a second state 120 of the system, the system seeks to maximize diversity and coverage from the identified micro-posts identified in the first state 110 by identifying a set S of top k documents that cover a large portion of currently popular topics discussed in an online environment or other environment. To identify the documents, an appropriate weighted-coverage objective function captures the extent at which important topics are covered, and a technique maximizes the weighted-coverage of the documents. In particular, given a set S of documents, the weighted-coverage of S is defined as the sum of weighted coverage of this set for each term, and the weight of at which each term is covered is the maximum weight of any document which is picked in S. The weighted-coverage set function is a sub-modular set function and thus a greedy algorithm gives a $$1 - \frac{1}{e}$$

approximation to maximize this function. This algorithm generates k documents by iteratively picking a new document that covers more new weight. A clustering of items is then generated by choosing important items around the k documents. Each document is put in a cluster corresponding to the closest item in S by defining a distance measure among the documents provided by the Jaccard similarity of documents based on a set of terms associated with those documents.

In a third state 130 of the system, a clustering is taken as the output of the second part, and two or more representative micro-posts from each cluster are chosen. These representative documents have high popularity, importance and diversity. To identify a set of diversified representative documents for each cluster, given a family of clusters $C_1, \ldots, C_k$ over documents and a distance function between each two documents, a center $c_i$ is identified for each cluster $C_i$ such that the total distance among $c_i$'s is maximized. The distance function (e.g., generalized Jaccard distance) satisfies triangle inequality, and using this property, a local search algorithm is provided with a guaranteed approximation factor of ½.

Figure 2:
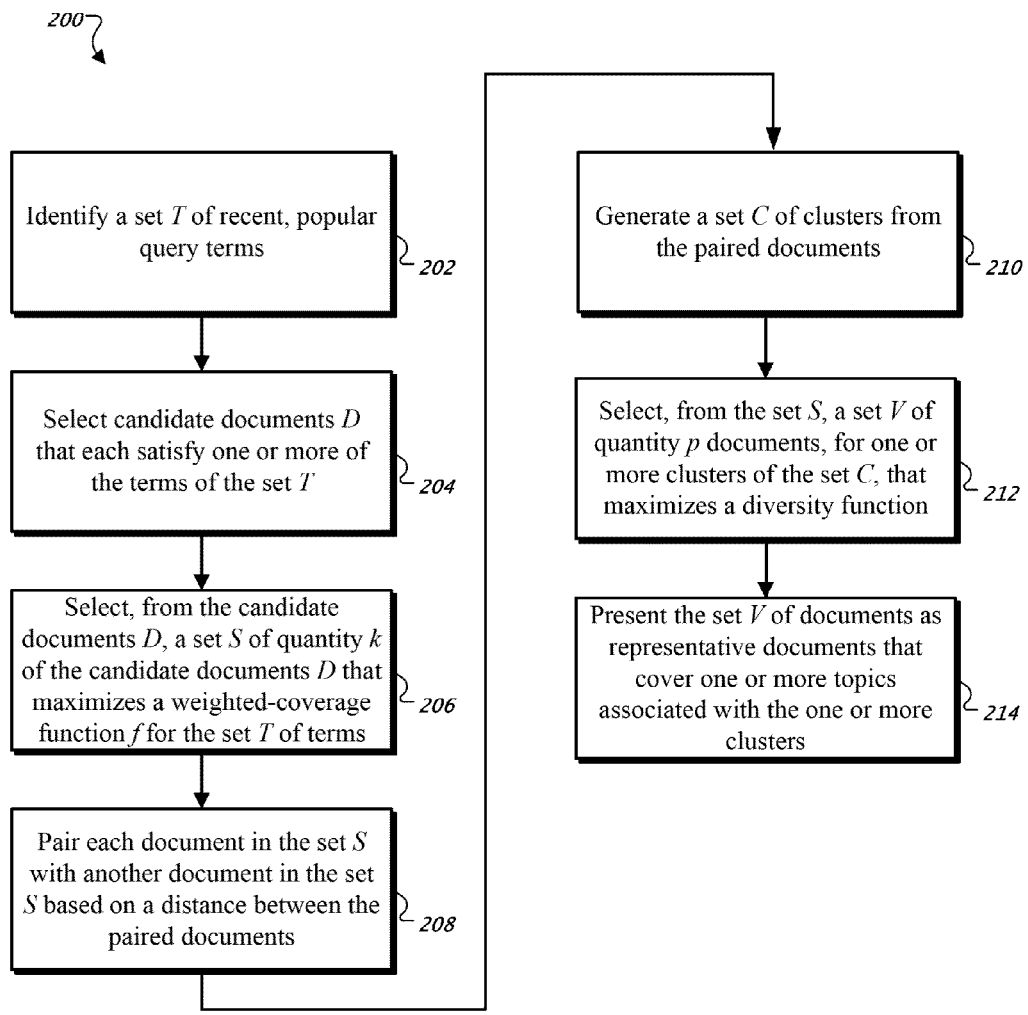
FIG. 2 is a flow chart illustrating an exemplary method for identifying hot trends from micro-posts.

FIG. 2 is a flow diagram of an example technique 200 for identifying trends using representative micro-posts. A set T of recent, popular query terms are identified at 202. Candidate documents D are selected that each satisfies one or more of the terms of the set T at 204. From the candidate documents D, a set S of quantity k of the candidate documents D are selected that maximize a weighted-coverage function f for the set T of terms at 206. In maximizing the weighted-coverage function f, the set S of quantity k of the candidate documents D covers the set T of query terms to a greater extent than any other set S' of quantity k of the candidate documents D.

Each document in the set S is paired with another document in the set S based on a distance between the paired documents at 208. A set C of clusters is generated from the paired documents at 210. Each cluster in the set C is associated with one or more topics of the recent, popular query terms. From the set S, a set V of quantity p documents is selected, for one or more clusters of the set C, that maximizes a diversity function at 212. The set V of documents is presented as representative documents that cover one or more topics associated with the one or more clusters at 214.

At 202, popular search queries having a set of terms, T={$t_1, \ldots, t_j$}, related to each search query is identified. Each query term is a single word, one or more words, or a phrase. Q is the set of top queries searched by users on a real-time search engine. Each query has a query score query_score(q), representing the popularity of this query, e.g., the number of users searched for this query. The query score may also reflect a frequency of an associated query. For each q in Q, let $D_q$ be a ranked list of top l micro-posts or documents for q, and for each document $d \in D_q$, a relevance_score(q, d) is provided.

For each q in Q, let $T_q \subset T$ be the set of terms corresponding to q. Each query q is transformed to a set of terms $T_q$, and an edge-weighted bipartite graph G(D, T, E) is constructed between documents $D = \cup_q D_q$ and all terms $T = \cup_{q \in Q} T_q$. The weight of the edge between a term $t \in T$ and a document $d \in D$ is denoted by w(d,t) and is computed as follows: for each query $q \in Q$ and each term $t \in T_q$, a weight (q, t) is associated which is proportional to the score of the query normalized by the number of terms associated with this query q, e.g.:

$$\text{weight}(q, t) = \frac{\text{query\_score}(q)}{|T_q|}. \tag{1}$$

The weight w(d, t) in the term-document bipartite graph is:

$$w(d, t) = \sum_{q: t \in T_q} \text{weight}(q, t) \, \text{relevance\_score}(q, d). \tag{2}$$

This weight captures the extent at which document d covers the term t; this weight models the relevance of the term to the document. These terms represent the main topics of hot trends over the online environment. After forming the above edge-weighted term-document bipartite graph, at 204 a set of top documents, $D = \{d_1, \ldots, d_n\}$, is determined that covers the maximum amount of terms, i.e., topics.

In some implementations, a greedy approximation algorithm may be used to identify the top documents, where the algorithm maximizes the extent to which the identified top documents cover the terms. In particular, a weighted-coverage objective function for any set of documents is described, and further a technique is described that maximizes this weighted-coverage function.

Given an edge-weighted bipartite graph G(D,T,E) and a subset $S \subseteq D$ of documents, at 206 the weighted-coverage of set S is calculated as the sum of the weighted coverage of terms covered by documents in S, where the weighted coverage of each term t is $\max_{d \in S} w(d,t)$, i.e., the extent at which this item t is covered. More formally, the weighted-coverage of documents in S satisfies:

$$f(S) = \sum_{t \in T} \max_{d \in S} w(d, t). \tag{3}$$

Given a parameter k whose value is the number of documents and the edge-weighted bipartite graph G(D,T,E), the goal is to choose a subset S of k documents that maximizes the weighted-coverage $f(S)$ of those k documents. In maximizing the weighted-coverage function $f$, the set S of quantity k of the candidate documents D covers the set T of query terms to a greater extent than any other set S' of quantity k of the candidate documents D. Selecting, from the candidate documents D, a set S of quantity k of the candidate documents D that maximizes a weighted-coverage function $f$ for the set T of query terms comprises: initializing an empty set of documents as the set S; and iteratively, until the set S includes the quantity k of the candidate documents D: selecting a document d, from the candidate documents D, that exhibits a maximum marginal increase in the weighted-coverage function $f$, and that is not already in the set S, and adding the document d to the set S. In some implementations, the following greedy algorithm is used to maximize $f(S)$.

Given the definition of the above set function $f$, the greedy algorithm to choose the top k documents starts from an empty set S of documents, at each step chooses a document d with the maximum marginal increase in function $f$, and adds this document to set S. The algorithm repeats this until it picks k elements. This can be implemented efficiently using the greedy algorithm shown in Table 1.

TABLE 1

GREEDY ALGORITHM TO IDENTIFY TOP DOCUMENTS

Input: The edge-weighted bipartite graph G(D,T,E) with edge weights w(d,t) for each d ∈ D and t ∈ T.
Output: A set S of k documents S={d₁, d₂, ..., d_k}.
Goal: Find set S of cardinality k maximizing $\Sigma_{t \in T} \max_{d \in S} w(d,t)$.
1. Initialize: S = 0
2. While |S| < k
3.   i ← i + 1
4.   Let $d_i$ = arg $\max_{d \in D \setminus S} \Sigma_{t \in T} w(d,t)$.
5.   Let S = S ∪ {$d_i$}
6.   for any d ∈ D \ S
7.     for any t ∈ T
8.       Let w(d,t)= max(0,w(d,t) − w($d_i$,t))

In some implementations, another way to define the weighted-coverage is as follows: Given a set S of documents, a general coverage set function $g_t: 2^D \to R$ is provided for each term t∈T, where $g_t(S)$ captures the extent at which the term t is covered. The total weighted-coverage function g(S) is then the sum of the $g_t(S)$ for all t∈T, i.e., $$g(T) = \sum_{t \in T} g_t(S). \tag{4}$$

The weighted-coverage function provided is $$g_t(S) = \max_{d \in D} w(d,t). \tag{5}$$

More generally, $g_t$ can be any concave function of the total weight of the documents in S covering the term t, i.e., $$g_t(S) = h\left(\sum_{d \in D} w(d, t)\right), \tag{6}$$

where h: R→R is a concave function. For concave functions h, function $g_t$ becomes sub-modular, and the coverage function g is also sub-modular. As a result, for any general concave function h, the problem of maximizing the general weighted-coverage function g is a sub-modular maximization problem subject to cardinality constraints, and thus a similar greedy algorithm is suitable to solve it within an approximation ratio of $$1 - \frac{1}{e}.$$

The greedy algorithm shown in Table 2 outputs a set S= $\{d_1, \ldots, d_k\}$ of top documents covering a large portion of popular terms appearing in users' queries. Each document in this set can be considered a representative document in a cluster of documents around it. A natural (possibly overlapping) clustering C=($C_1, C_2, \ldots, C_k$) of all documents can be constructed at 210, where $d_i \in C_i$, by first associating each document to a close representative document in S at 208 so that documents in S are paired. The documents are paired based on a distance between the paired documents, as described below. In some embodiments, each document in the set S is paired with another, closest document in the set S. In one embodiment, a document $d_1$ in the set S is paired with another document $d_2$, and the document $d_2$ in the set S is paired with another document $d_3$. In another embodiment, the document $d_1$ in the set S is paired with another document $d_2$, and the document $d_2$ in the set S is paired with the document $d_1$. A desired property of such representative documents is the diversity of those documents.

Each document in the set S is paired with another document at 208 before the set C of clusters is generated from the paired documents at 210. Each cluster in the set C of clusters comprises at least one pair of documents from the set S, and zero or more other documents from the set S.

A technique is described below that is used in some implementations for choosing a diversified set of representatives for each cluster. In other words, given a set of clusters $C=(C_1, C_2, \ldots, C_k)$, p diversified representatives are chosen in each cluster. Diversity is defined in reference to a distance function. An example distance function used in some implementations is described below. The diversity function may be expressed as $(\Sigma_{1 \le i \le k, 1 \le j \le p} \Sigma_{1 \le i' \le k', 1 \le j' \le p} GJD(D^i_j, D^{i'}_{j'}))$.

A generalized Jaccard distance between documents is defined as follows. Given an edge-weighted bipartite graph G(D,T,E), for two documents $d_1$ and $d_2$, the generalized Jaccard similarity between $d_1$ and $d_2$ is defined as:

$$GJS(d_1, d_2) = \frac{\sum_{t \in T} \min(w(d_1, t), w(d_2, t))}{\sum_{t \in T} \max(w(d_1, t), w(d_2, t))}. \quad (7)$$

Similarly, the generalized Jaccard distance between $d_1$ and $d_2$ is defined as:

$$GJS(d_1, d_2) = 1 - \frac{\sum_{t \in T} \min(w(d_1, t), w(d_2, t))}{\sum_{t \in T} \max(w(d_1, t), w(d_2, t))}. \quad (8)$$

These similarity and distance functions are a natural generalization of the Jaccard similarity and distance functions over sets with weighted elements. This generalized Jaccard distance satisfies the triangle inequality, i.e., for any three documents, $GJD(d_1, d_3) \le GJD(d_1, d_2) + GJD(d_2, d_3)$.

Using the above distance function, the maximum diversity problem can be stated as follows: Given a set of clusters $C=(C_1, C_2, \ldots, C_k)$, at 212 a set V of p representative documents $d_1^i, d_2^i, \ldots, d_p^i$ is determined in each cluster maximizing the total sum of distance among these documents, i.e., maximize $$\sum_{1 \le i \le k, 1 \le j \le p} \sum_{1 \le i' \le k, 1 \le j' \le p} GJD(d^i_j, d^{i'}_{j'}). \quad (9)$$

In maximizing the diversity function, the set V of the quantity p of documents selected for the one or more clusters has a greater sum of distances than any other set V' of quantity p documents of the set S.

Selecting, from the set S, a set V of quantity p representative documents, for a cluster $C_i$ of the set C, that maximizes a diversity function comprises: initializing an arbitrary set of quantity p documents from the set S as the set V; and iteratively, until no further swap of a document from the set V results in an increase in a sum of pairwise distances of documents in the set V: determining whether swapping a document d from the set V with a document d' that is paired with the document d increases a sum of pairwise distances of documents in the set V, and swapping the document d from the set V with a document d' that is paired with the document d when determining that swapping increases the sum of pairwise distances of documents in the set V. The set V of documents is presented in association with information identifying the one or more topics associated with the one or more clusters $C_i$. Presenting the information identifying the one or more topics comprises automatically obtaining a label associated with the one or more topics.

A local search algorithm chooses a set of diversified representatives. In general, in some implementations, the algorithm starts from an arbitrary set $S_i$ of representative documents in each cluster, and at each step, all pairs $(d,d') \in S_i \times C_i \setminus S_i$ of documents are considered inside and outside of the representatives, and examines swapping these two documents, i.e., removing document d and adding document d' to the set of representatives. If this swap increases the total diversity of the documents, i.e., if it increases the sum of pairwise distances of representatives, the algorithm makes this swap, i.e., it lets $S_i = S_i \setminus \{d\} \cup \{d'\}$. This is described more formally in Table 2.

TABLE 2

LOCAL SEARCH ALGORITHM TO CHOOSE
DIVERSIFIED REPRESENTATIVES

Input: A set of clusters $C = (C_1, C_2, ..., C_k)$ over a set of documents,
and a distance function GJD among documents.
Output: For each cluster $C_i$, a set of p
documents $S_i = \{d_1^i, d_2^i, ... d_p^i\}$, for each $1 \le i \le k$.
Goal: Find a set of representatives maximizing total diversity, i.e.,
$\Sigma_{1 \le i \le k, 1 \le j \le p} \Sigma_{1 \le i' \le k, 1 \le j' \le p} GJD(d_j^i, d_{j'}^{i'})$,
1. Initialize: Let $S_i$ be a set of top documents in $C_i$.
2. While there exists a local improvement do
3.  For any pair of documents $(d,d') \in S_i \times C_i \setminus S_i$ do
4.   If removing d from $S_i$ and adding d' to $S_i$ increases the
total diversity, i.e., if
  $g(S \setminus \{d\} \cup \{d'\}) > g(S)$ then
5.    Let $S_i := S_i \setminus \{d\} \cup \{d'\}$.

A property of the local search algorithm shown in Table 2 is its flexibility to optimize other objective functions, for example the quality and coverage of the documents. To optimize a different objective function, the sequence of local operations in the order of quality of the documents is employed, for example, the set of representatives is initialized to the set of documents with the highest quality score, and swapping other documents with these documents is considered in the order of their quality score. This quality score can take into account the reliability and coverage of each document, or the popularity of an owner of the micro-post, for example.

In some implementations, a computational time complexity is considered, and specifically, the complexity of the local search algorithm. This algorithm converges as the value of the metric increases at each operation. A small change in the algorithm can give a polynomial running time, while preserving the approximation factor of the algorithm. The modified algorithm performs the local swap improvements only if such a swap increases the total diversity by a $$1 + \frac{\varepsilon}{n}$$

factor for an appropriately small constant $\varepsilon > 0$. In other words, the modified algorithm swaps document d inside the set S with a document d' outside the set, only if $$g(S \setminus \{d\} \cup \{d'\}) > \left(\frac{\varepsilon}{n}\right) g(S).$$

Further, the local search algorithm does not need the clusters $C_1, \ldots, C_k$ to be disjoint, and these clusters can be arbitrary overlapping subsets of nodes. In particular, each cluster can include the whole set of documents, i.e., $C_i = D$. For this case, the diversity maximization algorithm is to choose a set of pk nodes in the graph to maximize diversity, independent of their coverage.

In some implementations of the algorithms, the practical running time of the algorithms can be improved by slight modifications. Specifically, the order of trying local improvements can change the running time of the algorithm and the quality of the output. Moreover, other than the diversity metric, other objective functions like relevance, weighted-coverage, and popularity of the micro-posts in the set of representatives can be considered.

A property of the local search algorithm is its flexibility in choosing the order of local improvements and the initial set of documents to start with. For example, if it is desired to simultaneously maximize the weighted coverage and diversity metrics, a set of documents with high weighted coverage is initially taken, and then the local search algorithm is employed as a post-processing step. Also, in running the local search algorithm, swapping of documents with higher weighted-coverage at each step can be considered. Moreover, other than choosing representatives for clusters, the idea behind the local search for choosing a set of k centers. In particular, the heuristic greedy algorithm shown in Table 3, which combines maximizing coverage and diversity, can be used.

Finally, at 214, the set V of p documents is presented as a representative set of documents that cover one or more topics associated with the one or more clusters.

TABLE 3

COMBINED HEURISTIC

Input: The edge-weighted bipartite graph G(D,T,E) with edge weights w(d,t) for each d ∈ D and t ∈ T.
Output: A set S of k documents S = $\{d_1, d_2, ..., d_k\}$.
Goal: Find a set S of cardinality k maximizing diversity, i.e.,
1. Initialize: S = 0
2. Sort documents D in the non-increasing order of weighted-coverage, i.e., $\Sigma_{t \in T} w(d,t)$
3. Let the sorted documents be $(d_1, d_2, ..., d_{|D|})$
4. For i from 1 to |D| do
5.    if |S| < k then
6.       S : S ∪ $\{d_i\}$.
7.    elseif swapping $d_i$ with any $d_j$ for j < i increases diversity,
8.       Let S := S \ $\{d_j\}$ ∪ $\{d_i\}$.

Figure 3:
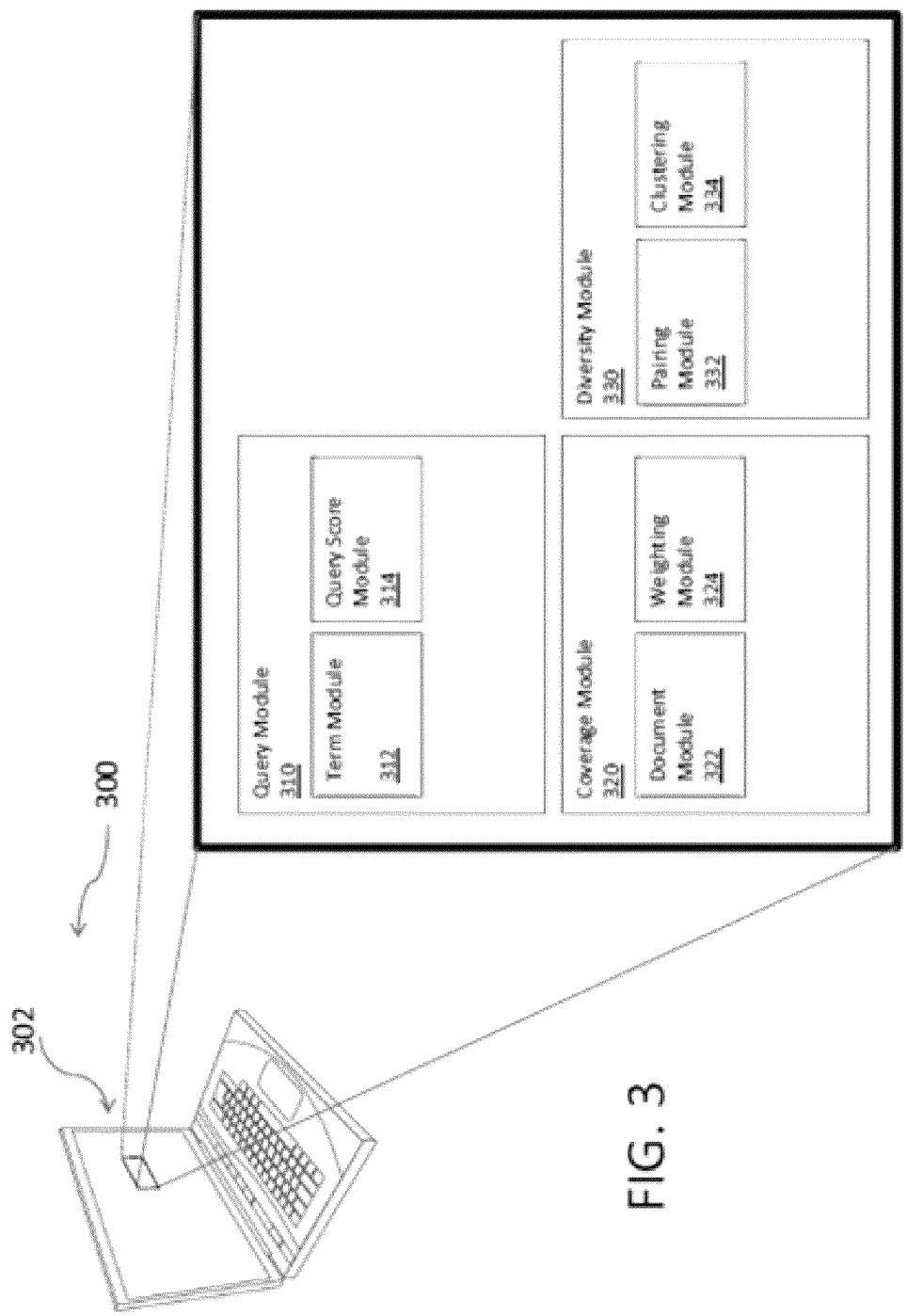
FIG. 3 is a schematic diagram of an example system for identifying trends via representative micro-posts.

FIG. 3 is a schematic diagram of an example system 300 for identifying trends via representative micro-posts using the methods described above. The system 300 may be implemented using a data processing apparatus, such as a computer 302. The computing device, however, can take a variety of forms.

A number components provided in the computer 302 may cooperate to provide various functionality. A query module 310 is provided to identify popular query terms. The query module may comprise a number of sub-modules, such as a term module 312 and a query score module 314. In some embodiments, the query module 310 receives a plurality of search queries from one or more users. The plurality of search queries may have been submitted to one or more search engines within a predetermined period of time. The term module 312 determines a set T of query terms from the plurality of search queries. The query score module 314 then calculates a query score for each of the query terms identified by the term module 314. The query score may reflect a frequency of a query or queries associated with a particular query term.

A coverage module 320 is provided to maximize coverage of relevant documents. The coverage module 320 may comprise a number of sub-modules, such as a document module 322 and a weighting module 324. As an input, the coverage module 320 receives one or more of the query terms and query score from the query module 310. The document module 322 receives this information from the query module 310 and provides a set D of candidate documents that covers the set T of query terms identified by the query module 310. The weighting module 324 then determines a set S of documents from the candidate documents that maximizes a weighted-coverage function, as described above.

A diversity module 330 is provided to maximize the diversity of relevant documents. The diversity module 330 may comprise a number of sub-modules, such as a pairing module 332 and a clustering module 334. The pairing module 332 receives the set S of documents from the coverage module 320 and pairs documents in the set S. The pairing module 332 may pair each document in the set S with another, closest document in the set S. In some embodiments, the pairing module 332 may utilize a generalized Jaccard distance (GJD) to form the pairings.

The clustering module 334 receives the pairings from the pairing module 332 to generate a set C of clusters, where each cluster in the set C of clusters comprises at least one pair of documents from the set S. Each cluster may include additional other documents from the set S. From the set S received from the diversity module 330 and by the coverage module 320, a set V of representative documents is determined that maximizes a diversity function, as described above.

Embodiments of the subject matter, the functional operations and the techniques described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
    identifying, with one or more processors, a set T of query terms;
    selecting, with the one or more processors, candidate documents D that each satisfy one or more of the terms of the set T;

selecting, from the candidate documents D, a set S of quantity k of the candidate documents D based on a weighted-coverage function $f$ for the set T of terms;

pairing each document in the set S with another document in the set S based on a distance between the paired documents;

generating, with the one or more processors, a set C of clusters from the paired documents, each cluster in the set C being associated with one or more topics of the query terms;

selecting, with the one or more processors, from the set S, a set V of quantity p documents, for one or more clusters of the set C, based on a diversity function, wherein the diversity function is expressed as $(\Sigma_{1 \leq i \leq k, \ 1 \leq j \leq p} \Sigma_{1 \leq i' \leq k', \ 1 \leq j' \leq p} \text{GJD}(D^i_j, D^{i'}_{j'}))$; and providing for presentation the set V of documents as representative documents that cover one or more topics associated with the one or more clusters.

2. The method of claim 1, wherein each document in the set S is paired with another, closest document in the set S.

3. The method of claim 2, comprising determining a generalized Jaccard distance (GJD) between the documents of the set S, wherein each document in the set S is paired with the other document in the set S based on the generalized Jaccard distance between the paired documents.

4. The method of claim 1, wherein a document $d_1$ in the set S is paired with another document $d_2$, and the document $d_2$ in the set S is paired with another document $d_3$.

5. The method of claim 1, wherein selecting the set S of candidate documents comprises maximizing the weighted coverage function $f$ for the set T of terms using a greedy algorithm.

6. The method of claim 1, wherein identifying the set T of query terms comprises:
   determining a query score for each of multiple query terms that have been submitted to a search engine within a predetermined period of time; and
   selecting, as part of the set T of query terms, the query terms that have been submitted to the search engine within the predetermined period of time and that have a query score which satisfies a threshold,
   wherein the query terms are recent and popular query terms.

7. The method of claim 1, wherein selecting, from the candidate documents D, a set S of quantity k of the candidate documents D based on a weighted-coverage function $f$ for the set T of query terms comprises:
   initializing an empty set of documents as the set S; and
   iteratively, until the set S includes the quantity k of the candidate documents D:
      selecting a document d, from the candidate documents D, that exhibits a maximum marginal increase in the weighted-coverage function $f$, and that is not already in the set S, and
      adding the document d to the set S.

8. The method of claim 1, wherein selecting the set V of documents comprises maximizing the diversity function, wherein, in maximizing the diversity function, the set V of the quantity p of documents selected for the one or more clusters has a greater sum of distances than any other set V' of quantity p documents of the set S.

9. The method of claim 1, wherein selecting, from the set S, a set V of quantity p representative documents, for a cluster $C_i$ of the set C, based on a diversity function comprises:
   initializing an arbitrary set of quantity p documents from the set S as the set V; and
   iteratively, until no further swap of a document from the set V results in an increase in a sum of pairwise distances of documents in the set V:
      determining whether swapping a document d from the set V with a document d' that is paired with the document d increases a sum of pairwise distances of documents in the set V, and
      swapping the document d from the set V with a document d' that is paired with the document d when determining that swapping increases the sum of pairwise distances of documents in the set V.

10. The method of claim 1, wherein the set V of documents is presented in association with information identifying the one or more topics associated with the one or more clusters $C_i$.

11. A non-transitory computer-readable medium having instructions encoded thereon, which, when executed by a processor, cause the processor to perform operations comprising:
   identifying, with one or more processors, a set T of query terms;
   selecting, with the one or more processors, candidate documents D that each satisfy one or more of the terms of the set T;
   selecting, from the candidate documents D, a set S of quantity k of the candidate documents D based on a weighted-coverage function $f$ for the set T of terms;
   pairing each document in the set S with another document in the set S based on a distance between the paired documents;
   generating, with the one or more processors, a set C of clusters from the paired documents, each cluster in the set C being associated with one or more topics of the query terms;
   selecting, with the one or more processors, from the set S, a set V of quantity p documents, for one or more clusters of the set C, based on a diversity function, wherein the diversity function is expressed as $(\Sigma_{1 \leq i \leq k, \ 1 \leq j \leq p} \Sigma_{1 \leq i' \leq k', \ 1 \leq j' \leq p} \text{GJD}(D^i_j, D^{i'}_{j'}))$; and
   providing for presentation the set V of documents as representative documents that cover one or more topics associated with the one or more clusters.

12. The non-transitory computer-readable medium of claim 11, wherein each document in the set S is paired with another, closest document in the set S.

13. The non-transitory computer-readable medium of claim 12, wherein the instructions encoded thereon, when executed by a processor, further cause the processor to perform operations comprising:
   determining a generalized Jaccard distance (GJD) between the documents of the set S, wherein each document in the set S is paired with the other document in the set S based on the generalized Jaccard distance between the paired documents.

14. The non-transitory computer-readable medium of claim 11, wherein a document $d_1$ in the set S is paired with another document $d_2$, and the document $d_2$ in the set S is paired with another document $d_3$.

15. The non-transitory computer-readable medium of claim 11, wherein selecting the set S that maximizes a weighted coverage function $f$ for the set T of terms comprises using a greedy algorithm.

16. The non-transitory computer-readable medium of claim 11, wherein identifying the set T of recent, popular query terms comprises:
   determining a query score for each of multiple query terms that have been submitted to a search engine within a predetermined period of time; and selecting, as part of the set T of query terms, the query terms that have been submitted to the search engine within the predetermined period of time and that have a query score which satisfies a threshold.

17. The non-transitory computer-readable medium of claim 11, wherein selecting, from the candidate documents D, a set S of quantity k of the candidate documents D that maximizes a weighted-coverage function $f$ for the set T of query terms comprises:
    initializing an empty set of documents as the set S; and
    iteratively, until the set S includes the quantity k of the candidate documents D:
        selecting a document d, from the candidate documents D, that exhibits a maximum marginal increase in the weighted-coverage function $f$, and that is not already in the set S, and
        adding the document d to the set S.

18. The non-transitory computer-readable medium of claim 11, wherein, in maximizing the diversity function, the set V of the quantity p of documents selected for the one or more clusters has a greater sum of distances than any other set V' of quantity p documents of the set S.

19. The non-transitory computer-readable medium of claim 11, wherein selecting, from the set S, a set V of quantity p representative documents, for a cluster $C_i$ of the set C, that maximizes a diversity function comprises:
    initializing an arbitrary set of quantity p documents from the set S as the set V; and
    iteratively, until no further swap of a document from the set V results in an increase in a sum of pairwise distances of documents in the set V:
        determining whether swapping a document d from the set V with a document d' that is paired with the document d increases a sum of pairwise distances of documents in the set V, and
        swapping the document d from the set V with a document d' that is paired with the document d when determining that swapping increases the sum of pairwise distances of documents in the set V.

20. The non-transitory computer-readable medium of claim 11, wherein the set V of documents is presented in association with information identifying the one or more topics associated with the one or more clusters $C_i$.

21. A system comprising:
    one or more computer processors; and
    one or more non-transitory computer readable devices that include instructions that, when executed by the one or more computer processors, causes the processors to perform operations, the operations comprising:
        identifying, with one or more processors, a set T of query terms;
        selecting, with the one or more processors, candidate documents D that each satisfy one or more of the terms of the set T;
        selecting, from the candidate documents D, a set S of quantity k of the candidate documents D based on a weighted-coverage function $f$ for the set T of terms;
        pairing each document in the set S with another document in the set S based on a distance between the paired documents;
        generating, with the one or more processors, a set C of clusters from the paired documents, each cluster in the set C being associated with one or more topics of the query terms;
        selecting, with the one or more processors, from the set S, a set V of quantity p documents, for one or more clusters of the set C, based on a diversity function, wherein the diversity function is expressed as ($\Sigma_{1 \le i \le k,\ 1 \le j \le p} \Sigma_{1 \le i' \le k',\ 1 \le j' \le p} GJD(D^i_j, D^{i'}_{j'})$); and
        providing for presentation the set V of documents as representative documents that cover one or more topics associated with the one or more clusters.

22. The system of claim 21, wherein each document in the set S is paired with another, closest document in the set S.

23. The system of claim 22, wherein the instructions, when executed by the one or more processors, further cause the one or more processors to perform operations comprising:
    determining a generalized Jaccard distance (GJD) between the documents of the set S, wherein each document in the set S is paired with the other document in the set S based on the generalized Jaccard distance between the paired documents.

24. The system of claim 21, wherein a document d1 in the set S is paired with another document d2, and the document d2 in the set S is paired with another document d3.

25. The system of claim 21, wherein selecting the set S that maximizes a weighted coverage function f for the set T of terms comprises using a greedy algorithm.

26. The system of claim 21, wherein identifying the set T of recent, popular query terms comprises:
    determining a query score for each of multiple query terms that have been submitted to a search engine within a predetermined period of time; and
    selecting, as part of the set T of query terms, the query terms that have been submitted to the search engine within the predetermined period of time and that have a query score which satisfies a threshold.

27. The system of claim 21, wherein selecting, from the candidate documents D, a set S of quantity k of the candidate documents D that maximizes a weighted-coverage function f for the set T of query terms comprises:
    initializing an empty set of documents as the set S; and
    iteratively, until the set S includes the quantity k of the candidate documents D:
        selecting a document d, from the candidate documents D, that exhibits a maximum marginal increase in the weighted-coverage function f, and that is not already in the set S, and
        adding the document d to the set S.

28. The system of claim 21, wherein, in maximizing the diversity function, the set V of the quantity p of documents selected for the one or more clusters has a greater sum of distances than any other set V' of quantity p documents of the set S.

29. The system of claim 21, wherein selecting, from the set S, a set V of quantity p representative documents, for a cluster Ci of the set C, that maximizes a diversity function comprises:
    initializing an arbitrary set of quantity p documents from the set S as the set V; and
    iteratively, until no further swap of a document from the set V results in an increase in a sum of pairwise distances of documents in the set V:
        determining whether swapping a document d from the set V with a document d' that is paired with the document d increases a sum of pairwise distances of documents in the set V, and
        swapping the document d from the set V with a document d' that is paired with the document d when determining that swapping increases the sum of pairwise distances of documents in the set V.

30. The system of claim 21, wherein the set V of documents is presented in association with information identifying the one or more topics associated with the one or more clusters Ci.

31. A computer-implemented method comprising:
identifying, with one or more processors, query terms;
selecting, with the one or more processors, candidate documents that satisfy one or more of the terms of the query terms;
selecting, from the candidate documents, candidate documents based on a weighted-coverage function for the query terms;
pairing documents from the candidate documents based on a distance between the paired documents;
generating, with the one or more processors, one or more clusters from the paired documents, a cluster being associated with one or more topics of the query terms;
selecting, with the one or more processors, from the candidate documents, one or more particular documents, for one or more clusters, based on a diversity function, wherein the diversity function is expressed as $(\Sigma_{1 \leq i \leq k,\ 1 \leq j \leq p} \Sigma_{1 \leq i' \leq k',\ 1 \leq j' \leq p}\ \text{GJD}(D^i_j, D^{i'}_{j'}))$; and
providing for presentation the particular documents as representative documents that cover one or more topics associated with the one or more clusters.

* * * * *